US009184941B2

(12) United States Patent
Lee et al.

(10) Patent No.: US 9,184,941 B2
(45) Date of Patent: Nov. 10, 2015

(54) CHANNEL ESTIMATION METHOD AND APPARATUS FOR COOPERATIVE COMMUNICATION IN A CELLULAR MOBILE COMMUNICATION SYSTEM

(71) Applicant: Samsung Electronics Co., Ltd., Gyeonggi-do (KR)

(72) Inventors: Hyojin Lee, Gyeonggi-do (KR); Younsun Kim, Gyeonggi-do (KR); Juho Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 225 days.

(21) Appl. No.: 13/896,723

(22) Filed: May 17, 2013

(65) Prior Publication Data

US 2013/0310100 A1 Nov. 21, 2013

Related U.S. Application Data

(60) Provisional application No. 61/648,296, filed on May 17, 2012.

(51) Int. Cl.
*H04L 25/02* (2006.01)
*H04B 7/02* (2006.01)

(52) U.S. Cl.
CPC ............ *H04L 25/0204* (2013.01); *H04B 7/024* (2013.01)

(58) Field of Classification Search
CPC ........ H04B 7/024; H04B 7/026; H04B 7/028; H04B 7/0408; H04B 7/0413; H04B 7/0491; H04B 7/06; H04B 7/0602; H04B 7/0604; H04B 7/0608; H04B 7/061; H04B 7/0613; H04B 7/0615

USPC ............ 455/517, 77, 509, 423, 67.11, 67.16, 455/115.1, 114.2, 135, 158.1, 246.1; 370/328, 252, 342, 441, 329, 208, 203
See application file for complete search history.

(56) References Cited

U.S. PATENT DOCUMENTS

| 2005/0073985 | A1* | 4/2005 | Heo et al. ...................... 370/342 |
| 2007/0298728 | A1* | 12/2007 | Imamura et al. ................ 455/77 |
| 2011/0269490 | A1* | 11/2011 | Earnshaw et al. ............. 455/509 |

(Continued)

FOREIGN PATENT DOCUMENTS

| KR | 1020110033974 | 4/2011 |
| KR | 1020120029338 | 3/2012 |

(Continued)

OTHER PUBLICATIONS

InterDigital Communications, LLC, "Size of CoMP Measurement Set", R1-122547, 3GPP TSG-RAN WG1 Meeting #69, May 12, 2012.

(Continued)

*Primary Examiner* — Tan H Trinh
(74) *Attorney, Agent, or Firm* — The Farrell Law Firm, P.C.

(57) ABSTRACT

A channel estimation method and apparatus are provided for a terminal in a cellular mobile communication system including a plurality of base stations. The method includes maintaining a maximum number of CSI processes supported by the UE; receiving CSI process report information; determining a number of CSI to be updated based on the maximum number of CSI processes supported by the UE; generating at least one CSI report based on the determined number of CSI to be updated; and transmitting the at least one CIS report to an evolved Node B (eNB).

12 Claims, 8 Drawing Sheets

(56) References Cited

U.S. PATENT DOCUMENTS

| | | | |
|---|---|---|---|
| 2012/0076028 A1* | 3/2012 | Ko et al. | 370/252 |
| 2012/0250541 A1* | 10/2012 | Ko et al. | 370/252 |
| 2012/0250543 A1* | 10/2012 | Abraham et al. | 370/252 |
| 2012/0257553 A1 | 10/2012 | Noh et al. | |
| 2013/0021980 A1 | 1/2013 | Yang et al. | |
| 2013/0028182 A1* | 1/2013 | Geirhofer et al. | 370/328 |
| 2013/0058295 A1 | 3/2013 | Ko et al. | |
| 2013/0176887 A1* | 7/2013 | Seo et al. | 370/252 |
| 2013/0258965 A1* | 10/2013 | Geirhofer et al. | 370/329 |
| 2013/0294352 A1* | 11/2013 | Park et al. | 370/328 |
| 2013/0343301 A1* | 12/2013 | Geirhofer et al. | 370/329 |
| 2014/0003381 A1* | 1/2014 | Lee et al. | 370/329 |
| 2014/0044076 A1* | 2/2014 | Etemad et al. | 370/329 |
| 2014/0078919 A1* | 3/2014 | Hammarwall | 370/252 |
| 2014/0092856 A1* | 4/2014 | Yang et al. | 370/329 |

FOREIGN PATENT DOCUMENTS

| | | |
|---|---|---|
| KR | 1020120047759 | 5/2012 |
| WO | WO 2011/115421 | 9/2011 |
| WO | WO 2011/122911 | 10/2011 |

OTHER PUBLICATIONS

Alcatel-Lucent Shanghai Bell et al., "CSI-RS Based Received Signal Quality Measurement for CoMP", R2-122724, 3GPP TSG-RAN WG2#78 Meeting, May 14, 2012.

NTT DOCOMO, "CQI Definition for Rel-11 CoMP", R1-121934, 3GPP TSG RAN WG1 Meeting #69, May 12, 2012.

Huawei, HiSilicon, "Discussion on CSI-RS Based Measurement and the Usage of the CoMP Resource Management Set", R1-122514, 3GPP TSG RAN WG1 Meeting #69, May 12, 2012.

Renesas Mobile Europe Ltd., "Downlink Control Signaling for CoMP", R1-113895, 3GPP TSG-RAN WG1 Meeting #67, Nov. 8, 2011.

MediaTek Inc., "Point Selection and CSI Feedback for CoMP Operation", R1-113051, 3GPP TSG-RAN WG1 #66bis, Oct. 4, 2011.

* cited by examiner

CHANNEL ESTIMATION METHOD AND APPARATUS FOR COOPERATIVE COMMUNICATION IN A CELLULAR MOBILE COMMUNICATION SYSTEM

PRIORITY

This application claims priority under 35 U.S.C. §119 to U.S. Provisional Patent Application No. 61/648,296, which was filed in the U.S. Patent and Trademark Office on May 17, 2012, the entire content of which is incorporated herein by reference.

FIELD OF THE INVENTION

The present invention relates generally to a method and apparatus for channel estimation of a terminal in a cellular mobile communication system including a plurality of Base Stations (BSs), and more particularly, to a method and apparatus for estimating channel efficiently in a Cooperative Multi-Point (CoMP) system in which multiple BSs perform cooperative downlink transmission to a terminal.

DESCRIPTION OF THE RELATED ART

Various mobile communication standards, such as High Speed Downlink Packet Access (HSDPA), High Speed Uplink Packet Access (HSUPA), Long Term Evolution (LTE), and LTE-Advanced (LTE-A) defined in $3^{rd}$ Generation Partnership Project (3GPP), High Rate Packet Data (HRPD) defined in $3^{rd}$ Generation Partnership Project-2 (3GPP2), and 802.16 defined in IEEE, have been developed to support high-speed, high-quality wireless packet data communication services.

Particularly, the LTE communication standard has been developed to support high speed packet data transmission and to maximize throughput of a radio communication system with various radio access technologies. LTE-A is an evolved version of LTE, which further improves the data transmission capability.

The existing $3^{rd}$ generation wireless packet data communication systems (including HSDPA, HSUPA and HRPD) use Adaptive Modulation and Coding (AMC) and Channel-Sensitive Scheduling techniques to improve transmission efficiency. At this time, AMC and Channel-Sensitive Scheduling are capable of applying appropriate modulation and coding schemes at most efficient times, based on partial channel status information fed back by a receiver.

In a wireless packet data communication system using AMC, a transmitter adjusts a data transmission amount based on channel conditions. That is, the transmitter decreases the data transmission amount for a bad channel condition in order to fix a received signal error probability at a certain level, and increases the data transmission amount for a good channel condition in order to efficiently transmit a large amount of information while maintaining a received signal error probability at an intended level.

In a wireless packet data communication system using channel sensitive scheduling, a transmitter first serves a user having a better channel condition among a plurality of users in order to increase system capacity, as compared to allocating a channel to one user. Such an increase of the system capacity is referred to as multi-user diversity gain.

When using AMC and a Multiple Input Multiple Output (MIMO) transmission scheme, it may be necessary to take a number of spatial layers and ranks for transmitting signals into consideration. In this case, a transmitter determines an optimal data rate in consideration of the number of layers for use in MIMO transmissions.

In general, Orthogonal Frequency Division Multiple Access (OFDMA) is expected to provide superior system throughput as compared to Code Division Multiple Access (CDMA). One of the main factors that allow OFDMA to increase system throughput is a frequency domain scheduling capability. As channel sensitive scheduling increases the system capacity using the time-varying channel characteristic, OFDM can be used to obtain more capacity gain using the frequency-varying channel characteristic.

Recently, research is being conducted to replace CDMA used in legacy $2^{nd}$ and $3^{rd}$ generation mobile communication systems with OFDMA for a next generation mobile communication system. Currently, the 3GPP and 3GPP2 are in the middle of the standardization of OFDMA-based evolved system.

Figure 1:
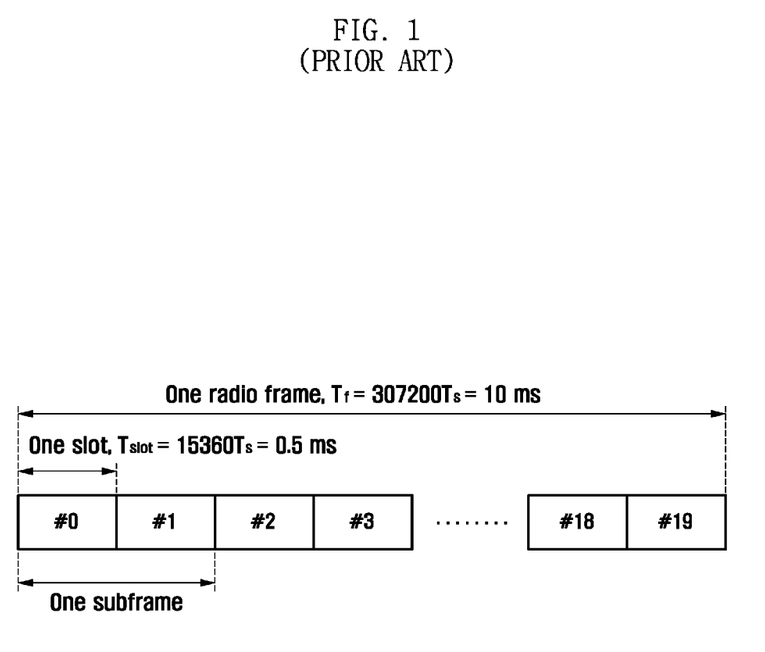
FIG. 1 illustrates a conventional radio frame format of an LTE-A system.

FIG. 1 illustrates a conventional radio frame format of an LTE-A system.

Referring to FIG. 1, a radio frame includes 10 subframes, where each subframe includes two slots. The 10 subframes are assigned subframe indices of 0 to 9, and the slots are assigned indices of #0 to #19.

Figure 2:
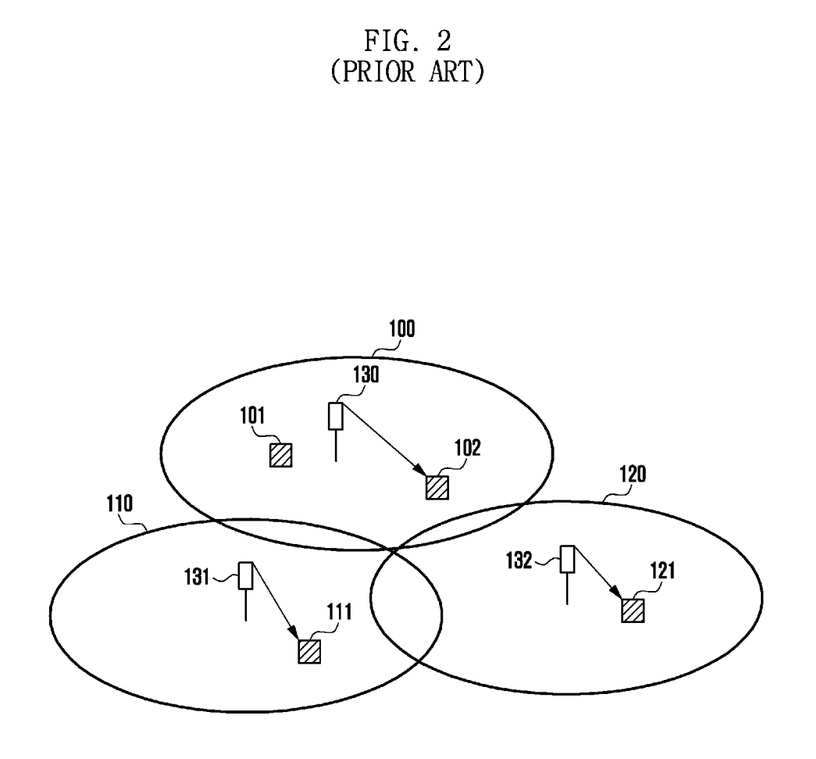
FIG. 2 illustrates a conventional cellular mobile communication system including a plurality of cells having a transmit/receive antenna arranged at a center of each of the cells.

FIG. 2 illustrates a conventional cellular mobile communication system including a plurality of cells having a transmit/receive antenna arranged at a center of each of the cells.

Referring to FIG. 2, in the cellular mobile communication system including the plurality of cells, a User Equipment (UE) receives mobile communication service from a cell selected for a semi-static duration with the above described techniques.

Specifically, the cellular mobile communication system includes three cells 100, 110, and 120. Cell 100 serves UEs 101 and 102 within its service area, cell 110 serves UE 111, and cell 120 serves UE 121. Reference numbers 130, 131, and 132 denote eNBs managing cells 100, 110, and 120, respectively.

UE 102, which is served by cell 100, is located farther from the antenna 130 than UE 101. Accordingly, UE 102 experiences significant interference from the central antenna of neighbor cell 120, and therefore, is served by UE 100 at a relatively low data rate.

When cells 100, 110, and 120 independently provide mobile communication services, they each transmit a Reference Signal (RS) for downlink channel estimation at a recipient. Particularly in a 3GPP LTE-A system, a UE measures a channel condition between an eNB and itself using a Channel Status Information Reference Signal (CSI-RS) transmitted by the eNB.

Figure 3:
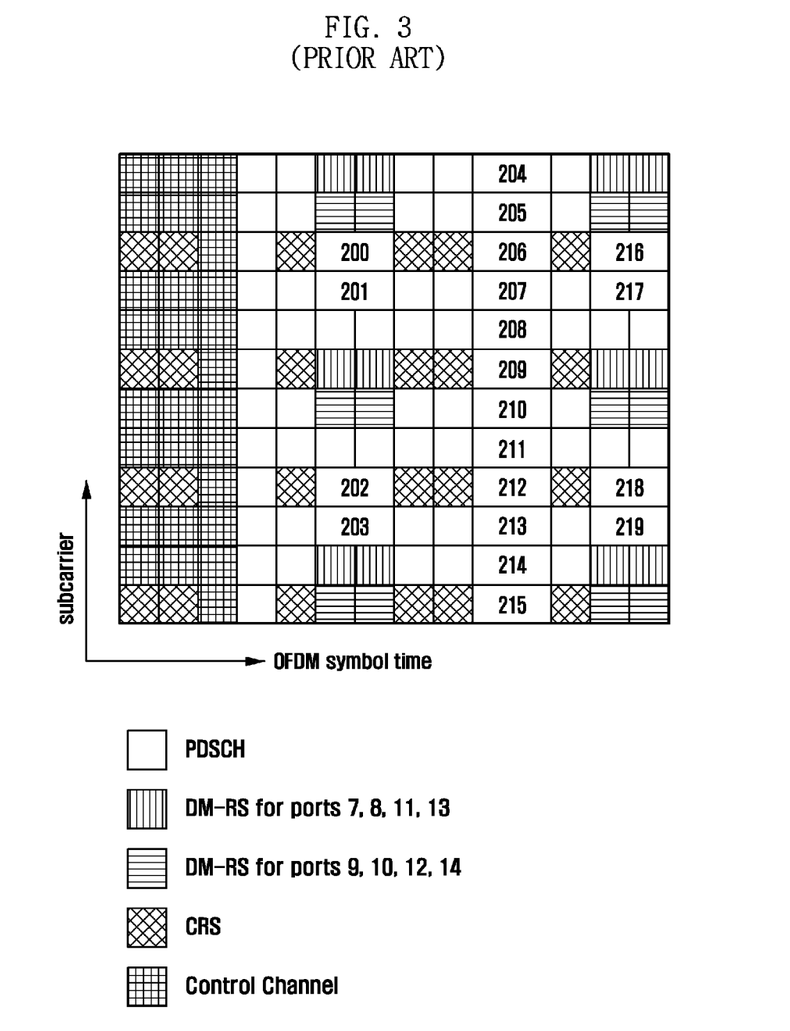
FIG. 3 illustrates CSI-RS positions in a resource block transmitted from an eNB to a UE in a conventional LTE-A system.

FIG. 3 illustrates CSI-RS positions in a resource block transmitted from an eNB to a UE in a conventional LTE-A system. Specifically, the signals mapped in the resource block in FIG. 3 follows the technical specifications in the LTE-A standard.

Referring to FIG. 3, two CSI-RS antenna port signals are mapped to each of the positions 200 to 219. That is, the eNB transmits two CSI-RSs for downlink measurement to the UE at position 200. Referring to the cellular mobile communication system illustrated in FIG. 2, the CSI-RS is transmitted in different positions corresponding to the respective cells. For example, the CSI-RS is transmitted at position 200 for cell 100, at position 205 for cell 110, and at position 210 for cell 120. Basically, the cells are allocated resources at different positions for CSI-RS transmission in order to prevent the CSI-RSs of different cells from interfering with each other.

In a downlink, a subframe for carrying a CSI-RS is determined by parameter $I_{CSI-RS}$, which is transmitted through Radio Resource Control (RRC) signaling. If $I_{CSI-RS}$ is received, the UE determines the CSI-RS periodicity $T_{CSI-RS}$ and the CSI-RS subframe offset $\Delta_{CSI-RS}$ by referencing Table 1.

TABLE 1

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

The UE receives CSI-RS at the subframe fulfilling Equation (1).

$$(10n_f + \lfloor n_s/2 \rfloor - \Delta_{CSI-RS}) \bmod T_{CSI-RS} = 0. \qquad (1)$$

In Equation (1), $n_f$ denotes a radio frame number, and $n_s$ denotes a slot number in the radio frame.

In a cellular mobile communication system as illustrated in FIG. 2, a UE located at a cell edge suffers significant interference from a neighbor cell, and thus, cannot be served at a high data rate. That is, a UE's location within a cell influences whether an eNB can allocate a data rate required for providing the UE with a high speed data service. As a result, while a conventional cellular mobile communication system can provide data service at a higher data rate to a UE close to a center of a cell, it cannot guarantee the high data rate to a UE located farther from the center of the cell.

In order to provide a UE located at a cell edge with a data service at a high data rate, a new transmission technique, i.e., CoMP transmission, has been proposed for multiple cells to cooperatively perform transmission to a UE in the LTE-A system. However, using a CoMP transmission technique, multiple CSI-RSs for different cells may be allocated per UE, and thus, the UE has to receive the multiple CSI-RSs in order to efficiently estimate multiple channels.

SUMMARY OF THE INVENTION

Accordingly, the present invention is designed to address at least the problems and/or disadvantages described above and to provide at least the advantages described below.

An aspect of the present invention is to provide a method and apparatus for channel estimation of a UE in a cellular mobile communication system, wherein adjacent cells cooperate for data transmission to the UE located at a cell edge through CoMP transmission in the cellular mobile communication system.

Another aspect of the present invention is to provide a method and apparatus for channel estimation of a UE in a cellular mobile communication system, wherein cells provide improved mobile communication service as compared to data transmission without cooperation in the cellular mobile communication system.

Another aspect of the present invention is to provide a method and apparatus for channel estimation of a UE in a cellular mobile communication system, wherein the UE determines cells that are selectively transmitting data to the UE at a cell edge.

In accordance with an aspect of the present invention, a method is provided for transmitting a CSI report by a UE in a communication system. The method includes maintaining a maximum number of CSI processes supported by the UE; receiving CSI process report information; determining a number of CSI to be updated based on the maximum number of CSI processes supported by the UE; generating at least one CSI report based on the determined number of CSI to be updated; and transmitting the at least one CIS report to an eNB.

In accordance with another aspect of the present invention, a method is provided for receiving a CSI report by an eNB in a communication system. The method includes acquiring a maximum number of CSI process supported by a UE; transmitting CSI process report information to the UE; determining a number of CSI to be updated, based on the maximum number of CSI process supported by the UE; and receiving at least one CIS report from the UE, based on an updated CSI in accordance with the determined number of CSI to be updated.

In accordance with another aspect of the present invention, a UE is provided for transmitting a CSI report in a communication system. The UE includes a communication unit configured to communicate with an eNB; and a control unit configured to maintain a maximum number of CSI processes supported by the UE, receive CSI process report information, determine a number of CSI to be updated, based on the maximum number of CSI processes supported by the UE, generate at least one CSI report, based on the determined number of CSI to be updated, and transmit the at least one CIS report to the eNB.

In accordance with another aspect of the present invention, an eNB is provided for receiving a CSI report in a communication system. The eNB includes a communication unit configured to communicate with a UE; and a control unit configured to acquire a maximum number of CSI processes supported by the UE, transmit CSI process report information, determine a number of CSI to be updated, based on the maximum number of CSI processes supported by the UE, and receive at least one CIS report from the UE, based on an updated CSI as according to the determined number of CSI to be updated.

BRIEF DESCRIPTION OF DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention are described in detail below with reference to the accompanying drawings. Detailed descriptions of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, definitions should be made on the basis of the overall content of the present specification.

Further, although embodiments of the present invention will be described below with reference to an OFDM-based wireless communication system, i.e., for the 3GPP EUTRA standard, those skilled in the art should understand that the embodiments of present invention are also applicable to other communication systems having similar technical backgrounds and channel formats, with slight modifications, without departing from the spirit and scope of the present invention.

A cellular radio communication system is formed with a plurality of cells in a restricted area. Each cell is a coverage area of an eNB, which provides UEs with radio communication services within the cell. Herein, a specific UE is served by a cell determined semi-statically. Such a radio communication system is referred to as non-CoMP system, as compared to the CoMP system herein.

In the non-CoMP system, a UE is assigned a data rate that varies significantly according to its location within a cell. For example, a UE located nearer to a center of the cell is assigned a higher data rate, while a UE located farther from the center of the cell is assigned a lower data rate.

In contrast, in the CoMP system, multiple cells cooperate for data transmission to a UE located at cell edge. The CoMP system is superior to the non-CoMP system in quality of mobile communication service.

In accordance with an embodiment of the present invention, a method is provided for a UE to measure channels from multiple cells and efficiently feed back the measurement results in consideration of an operation mode of the CoMP system, such as Dynamic cell Selection (DS), DS with Dynamic Blanking (DS/DB), and Joint Transmission (JT).

DS is a technique wherein a UE measures channel status per cell and feeds back the measurement result to an eNB. Using the measurement result, the eNB dynamically selects the cell for downlink data transmission to the UE.

DS/DB is a technique wherein data transmission is muted in a specific cell in order to reduce interference in another cell.

JT is a technique for simultaneously transmitting data to a specific UE in multiple cells.

In accordance with an embodiment of the present invention, a channel estimation method is provided for a UE to estimate channels efficiently for CoMP transmission, in order to adopt DS, DS/DB, and/or JT techniques efficiently in the LTE-A system. However, the embodiments of the present invention are not limited to adopting DS, DS/DB, or JT to the LTE-A system, but can be applied to various radio communication systems supporting cooperative data transmission of multiple cells (base stations) to a terminal located at the cell edge.

Figure 4:
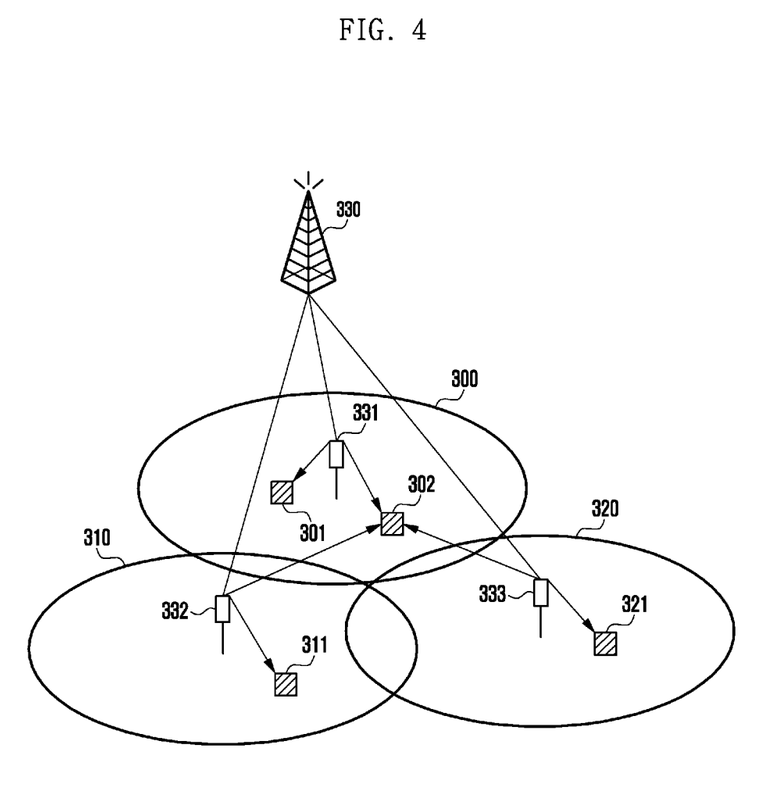
FIG. 4 illustrates a cellular mobile communication system according to an embodiment of the present invention.

FIG. 4 illustrates a cellular mobile communication system according to an embodiment of the present invention.

Referring to FIG. 4, the cellular mobile communication system includes three cells 300, 310, and 320. Herein, a cell is a service area centered around a specific transmission point, e.g., a Remote Radio Head (RRH) sharing a cell ID with a macro eNB within a macro cell, or a macro or pico cell having a unique cell ID.

In accordance with an embodiment of the present invention, a central controller is an apparatus that communicates data with UEs and processes data. When a transmission point is the RRH sharing a cell ID with the macro eNB, the macro eNB can be referred to as the central controller. When the transmission point is the macro or pico cell having a unique cell ID, an apparatus managing the cells integrally can also be referred to as the central controller.

The cellular mobile communication system includes UEs 301, 311, and 321, which each receive data from a nearest cell, and UE 302, which receives data through CoMP transmission from cells 300, 310, and 320. The UEs 301, 311, and 321 perform channel estimation based on a CSI-RS for a respective cell in which the UEs 301, 311, and 321 are located and transmit the corresponding feedback to a central controller 330.

Further, the cellular mobile communication system includes eNBs 331, 332, and 333 of the respective cells 300, 310, and 320, which also communicate with the central controller 330.

In FIG. 4, however, UE 302, which is served in a CoMP transmission scheme from cells 300, 310, and 320, performs channel estimation for all of the three cells 300, 310, and 320. Therefore, in order for UE 302 to perform channel estimation, the central controller 330 assigns three CSI-RSs corresponding to cells 300, 310, and 320, which are participating in the CoMP transmission for the UE 302.

Figure 5:
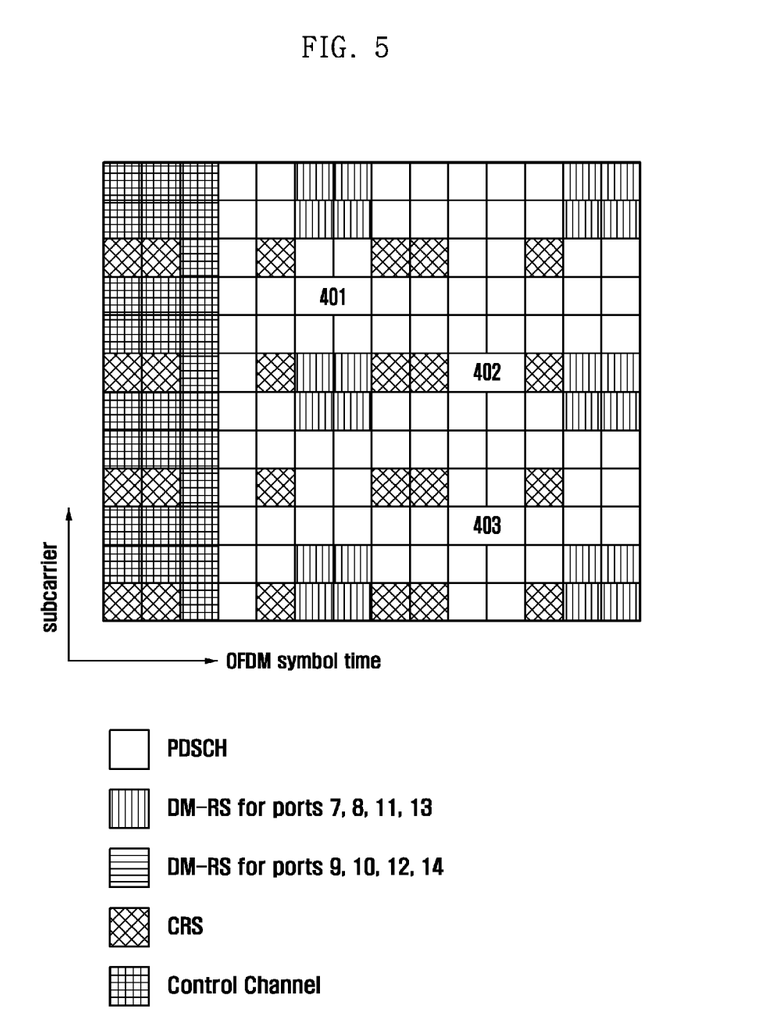
FIG. 5 illustrates a configuration of a resource block including a CSI-RS transmitted from an eNB to a UE according to an embodiment of the present invention.

FIG. 5 illustrates a configuration of a resource block including a CSI-RS transmitted from an eNB to a UE according to an embodiment of the present invention. The signals mapped to the resource block in FIG. 5 are identical to those of FIG. 3, and a detailed description thereon follows the LTE-A standard.

Referring to FIG. 5, the central controller 330 allocates resources 401, 402, and 403 for three CSI-RSs, so that UE 302 receiving CoMP transmission can estimate channels from cells 300, 310, and 320. The resources are allocated to correspond to the CSI-RSs for channel estimations in the respective cells. Reference number 401 denotes the resource allocated to a CSI-RS for channel estimation in cell 300, reference number 402 denotes the resource allocated to a CSI-RS for channel estimation in cell 402, and reference number 403 denotes the resource allocated to a CSI-RS for channel estimation in cell 403. A set of cells having the resource allocated to at least one CSI-RS transmitted for channel estimation of the CoMP UE is referred to as a measurement set.

Although FIG. 5 illustrates three CSI-RS resources for three cells allocated in a resource block, multiple CSI-RSs for each UE are carried by separately configured subframes. That is, the CSI-RS subframe configuration parameter $I_{CSI-RS}$ as shown in Table 1 is transmitted for the CSI-RS resources 401, 402, and 403 of the three cells, respectively. If $I_{CSI-RS}$ is received, the UE acquires the CSI-RS periodicity $T_{CSI-RS}$ and the CSI-RS subframe offset $\Delta_{CSI-RS}$ as transmission timing information by referencing Table 1. Also, the UE receives the information on the number of transmit antennas corresponding to each CSI-RS in the measurement set. Information on a CSI-RS transmit power and Multimedia Broadcast Multicast Service Single Frequency Network (MBSFN) subframe for each cell may also be transmitted.

Considering the above-described cooperative transmission, UE 302 is capable of estimating channels of multiple cells and, for this purpose, a plurality of CSI-RSs are transmitted. The CSI-RSs transmitted by the multiple cells are mapped to specific resource positions in one resource block as illustrated in FIG. 5 with respective transmission periodicity and offset. That is, the UE 302 receives three CSI-RSs corresponding to the three cells 300, 310, and 320 at a same subframe timing, according to the CSI-RS periodicity and CSI-RS subframe offset, two CSI-RS at the same subframe, but one CSI-RS at other subframe timing in the same resource block, or all of the three CSI-RSs at different subframe timings. These three cases of transmitting the three different CSI-RSs show the same effect in that UE 302 estimates the channels of cells 300, 310, and 320 with individual CSI-RSs, however, increases the hardware complexity per time to receive three CSI-RSs and estimate all of the three channels at one subframe timing. Consequently, a long delay occurs between CSI-RS reception timing and channel estimation and feedback information generation timing. Further, the long delay between the CSI-RS reception timing and the feedback information acquisition timing causes problems in feedback information reliability, resulting in system performance degradation.

Accordingly, an embodiment of the present invention provides a method for a UE to generate channel feedback information based on M CSI-RSs selected among N CSI-RSs transmitted at a subframe. Herein, N is a natural number greater than M, and a rule for selecting the M CSI-RSs is shared between eNBs 331, 332, and 333 and UE 302.

First, UE 302 determines a maximum number of CSI-RSs to receive at one subframe for use in generating channel feedback information. A first method is to generate feedback information based on some selected CSI-RSs, when the number of CSI-RSs transmitted at one subframe is greater than a predetermined number of CSI-RSs per subframe. For example, if the predetermined number of CSI-RSs is 2 and three or more cell CSI-RSs are transmitted at one subframe, the UE selects two of the transmitted CSI-RSs to generate the feedback information.

A second method for determining the number of CSI-RSs for use in generating the channel feedback information is to generate the feedback information based on some selected CSI-RSs, when the number of antenna ports for CSI-RSs is greater than a predetermined number of CSI-RS antenna ports. For example, if the predetermined number of CSI-RS antenna ports is 8, two CSI-RSs are transmitted through 4 antenna ports, one CSI-RS is transmitted through two antenna ports, and the total number of antenna ports is greater than 8, the UE selects two of the three CSI-RSs to generate the feedback information.

A third method for determining the number of CSI-RSs for use in generating the channel feedback information is to report, to the eNB, the number of CSI-RSs that the UE is able to process, and to generate the feedback information based on some selected CSI-RSs, when the number of CSI-RSs transmitted at a subframe is greater than a predetermined number of CSI-RSs that the UE is able to process. For example, if the predetermined number of CSI-RSs that the UE has reported to the eNB is 2 and three or more cells' CSI-RSs are transmitted at one subframe, the UE selects two of the three CSI-RSs to generate the feedback information.

A description is made of the method for generating the channel feedback information based on M CSI-RSs selected among N CSI-RSs received at one subframe. The first method for selecting some of the received CSI-RSs is to use the CSI-RS allocation index. As described above, each CSI-RS is configured to have the position in the resource block, transmission timing information such as $I_{CSI-RS}$, number of antenna ports, and CSI-RS transmit power; and the CSI-RS resource allocation is notified to the UE through Radio Resource Control (RRC) signaling of the eNB with unique allocation index. That is, the first method for selecting M CSI-RSs among the received CSI-RSs is to select M CSI-RSs in an ascending order of indices of N CSI-RSs. For example, if the UE is capable of estimate up to two CSI-RSs is 2 and if three cells' CSI-RSs are transmitted at one subframe with respective CSI-RS resource allocation indices 1, 2, and 3, the UE estimates the CSI-RSs indicated by indices 1 and 2 to generate the channel feedback information.

The second method for selecting M CSI-RSs among the N CSI-RSs received at a subframe is to generate, when the eNB transmits an RRC signal allocating CSI-RS resource with priorities of the CSI-RSs to the UE, the channel feedback information based on the M CSI-RSs selected in the order of priorities of the N CSI-RSs. For example, if the UE is capable of estimate up to two CSI-RSs, if three cells' CSI-RSs are transmitted at a subframe, and if an RRC signal indicating the priorities 1, 2, and 3 of the CSI-RSs is received, the UE estimates the CSI-RSs having the priorities 1 and 2 to generate the channel feedback information. The CSI-RS selection based on the RRC signal information of the priority includes selecting one CSI-RS based on the RRC signal indicating the CSI-RS of the serving cell. That is, when allocating CSI-RS resource, eNB is capable of setting one bit to notify the UE whether the corresponding CSI-RS is serving cell such that the UE estimates the channel based on the CSI-RS of the serving cell to generate the feedback information without extra RRC signaling for information of the priorities of N CSI-RSs.

The third method for selecting M CSI-RSs among N CSI-RSs received at a subframe generates the channel feedback information based on the M CSI-RSs in a descending order of most recently reported RSRPs of the CSI-RSs, which the UE 302 has reported to an eNB, among N CSI-RSs. The UE 302 reports the received signal strengths of the CSI-RSs to an eNB through higher layer signaling in the form of RSRP information. If the RSRP of CSI-RS is high, this means high channel estimation accuracy, and thus, it is possible to increase the channel feedback information reliability by selecting M CSI-RSs in a descending order of RSRP.

Figure 6:
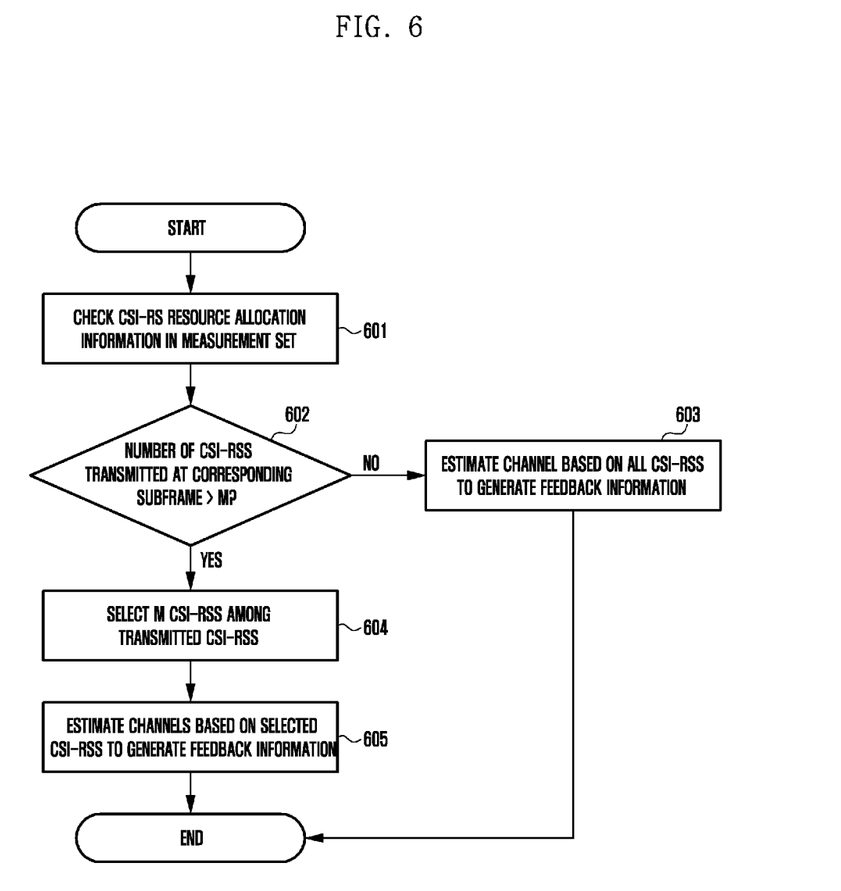
FIG. 6 is a flowchart illustrating a method for generating channel feedback information based on M CSI-RSs selected among N CSI-RSs received at a subframe, according to an embodiment of the present invention.

FIG. 6 is a flowchart illustrating a method for generating channel feedback information based on M CSI-RSs selected among N CSI-RSs received at a subframe, according to an embodiment of the present invention.

Referring to FIG. 6, in step 601, a UE checks the allocation information on each CSI-RS resource in a measurement set notified by an eNB. As described above, the CSI-RS resource allocation information includes a position of a corresponding CSI-RS in a resource block, transmission timing, such as $I_{CSI-RS}$, a number of antenna ports, and a CSI-RS transmission power, and optionally CSI-RS resource priority information or whether CSI-RS is from a serving cell.

In step 602, the UE determines whether the number of CSI-RSs transmitted at the corresponding subframe is greater than M. As described above, M can be the number of CSI-RS resources or a value acquired based on the number of antenna ports or reported by the UE to the eNB. If the number of CSI-RSs transmitted at the corresponding subframe is less than or equal to M in step 602, the UE estimates the channel based on all of the CSI-RSs transmitted at the subframe in order to generate feedback information in step 603. However, if the number of CSI-RSs transmitted at the corresponding subframe is greater than M, the UE selects M CSI-RSs among the received CSI-RSs in step 604. As described above, the M CSI-RSs can be selected based on a resource allocation index, a priority informed through separate RRC signaling, or a most recently reported RSRP value. After M CSI-RSs have been selected in step 604, the UE estimates channels based the selected CSI-RSs, in order to generate feedback information in step 605.

Another method for generating the channel feedback information based on the M CSI-RSs selected among the N CSI-RSs received at one subframe is to use the number of antenna ports corresponding to the received CSI-RSs. As described above, the CSI-RS resource allocation information includes a position in the source block, transmission timing, such as $I_{CSI-RS}$, a number of antenna ports, and a CSI-RS transmission power. In this case, the method selects CSI-RSs having more antenna ports among N CSI-RSs first, and if the CSI-RSs have the same number of antenna ports, using the CSI-RS selection method described with reference to FIG. 6. For example, if the UE is capable of estimating up to two CSI-RSs, three cells' CSI-RSs are transmitted at one subframe, and the CSI-RSs have 2, 2, and 4 antenna ports, respectively, then the UE selects the CSI-RS having 4 antenna ports first and then one of the two CSI-RSs having 2 antenna ports, based on the CSI-RS allocation index, RRC information indicating priority, or RSRP information. Thereafter, the UE estimates the corresponding CSI-RSs to generate the channel feedback information.

Finally, it can be considered to skip generating, if the number of CSI-RSs received at a subframe is greater than M, channel feedback information for all of the received CSI-RSs.

Figure 7:
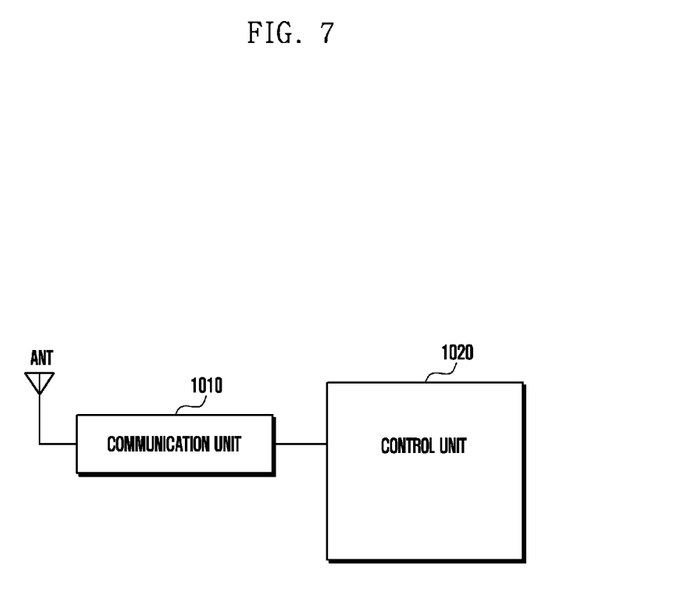
FIG. 7 is a block diagram illustrating a UE according to an embodiment of the present invention.

FIG. 7 is a block diagram illustrating a UE according to an embodiment of the present invention.

Referring to FIG. 7, the UE includes a communication unit 1010, e.g., a transceiver, and a control unit 1020, e.g., a controller or a microprocessor. Although the following description is directed to the UE including only the communication unit 1010 and the control unit 1020, the present invention is not limited thereto. That is, the UE may also include a display, an input device, a storage device, etc.

The communication unit 1010 transmits and receives signals. Herein, the communication unit 1010 receives reference signals for a CoMP technique and transmits estimated channel information to a central controller, under a control of the control unit 1020.

The control unit 1020 controls states and operations of all components the UE (not shown) according to the above described methods, e.g., as illustrated in FIG. 6. Herein, the control unit 1020 checks measurement timings of CSI-RSs in a measurement group allocated to the UE, and when the number of CSI-RSs received at a subframe is greater than M, selects M CSI-RSs according to the priority, in order to control a channel estimator to estimate channels, as described above.

The control unit 1020 checks received measurement set information and estimates channels using the selected CSI-RSs, according to the measurement set information.

Figure 8:
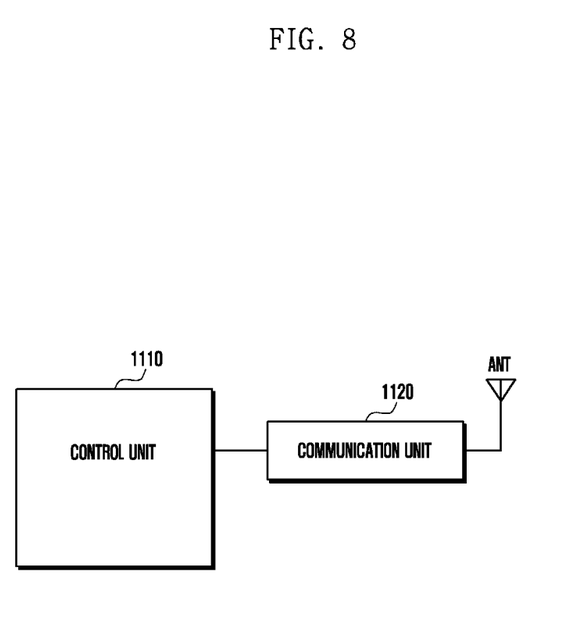
FIG. 8 is a block diagram illustrating a central controller according to an embodiment of the present invention.

FIG. 8 is a block diagram illustrating a central controller according to an embodiment of the present invention.

Referring to FIG. 8, the central controller includes a control unit 1110, such as a controller or a microprocessor, and a communication unit 1120, such as a transceiver. Although the following description is directed to the central controller including only the control unit 1110 and the communication unit 1120, the present invention is not limited thereto. For example, the central controller may also include a display, an input device, a storage device, etc.

The control unit 1110 controls states and operations of all components the central controller (not shown), according to the above-described methods, e.g., as illustrated in FIG. 6. Herein, the control unit 1110 maps per-cell CSI-RSs to respective resources for a UE's channel estimation and, if necessary, notifies the UE of the CSI-RS resource allocation information.

More specifically, the control unit 1110 allocates CSI-RS resources and timings for the UE to estimate the per-cell channels and transmits, through the communication unit 1120, the CSI-RSs on the corresponding resources at the corresponding timings. The CSI-RSs are mapped to the resources allocated per cell.

The communication unit 1120 communicates data with the UE or cells controlled by the central controller. Herein, the communication unit 1120 transmits the CSI-RSs to the UE on the allocated resources at the scheduled timings under the control of the control unit 1110.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method of a User Equipment (UE), for communicating in a communication system, the method comprising:
   receiving a request for channel state information (CSI) report from a base station;
   identifying a maximum number of CSI processes supported by the UE;
   determining at least one CSI process to be updated based on the maximum number of CSI processes supported by the UE and index of CSI processes;
   generating at least one CSI based on the determined at least one CSI processes to be updated; and
   transmitting the CSI report to the bases station based on the generated CSI.

2. The method of claim 1, wherein determining the at least one CSI process comprises determining the at least one CSI process corresponding to N lowest-indexed CSI processes,
   wherein the N indicates the maximum number of CSI processes.

3. The method of claim 1, further comprising:
   transmitting the maximum number of CSI processes supported by the UE.

4. A method of a base station for communicating in a communication system, the method comprising:
   transmitting a request for channel state information (CSI) report to a user equipment (UE);
   obtaining a maximum number of CSI processes supported by a User Equipment (UE);
   receiving, from the UE, at least one CSI generated based on at least one CSI process to be updated,
   wherein the at least one CSI process is determined based on the maximum number of CSI processes supported by the UE and index of CSI process.

5. The method of claim 4, wherein the at least one CSI process corresponds to N lowest-indexed CSI processes,
   wherein the N indicates the maximum number of CSI processes.

6. The method of claim 4, further comprising:
   receiving the maximum number of CSI processes supported by the UE.

7. A User Equipment (UE), in a communication system, the UE comprising:

a communication unit for communicating with a base station;

a control unit for receiving a request for channel state information (CSI) report from a base station, identifying a maximum number of CSI processes supported by the UE, determining at least one CSI process to be updated based on the maximum number of CSI processes supported by the UE and index of CSI processes, generating at least one CSI based on the determined at least one CSI process to be updated, and transmitting the CSI report to the base station based on the updated CSI.

8. The UE of claim 7, wherein the control unit updates the at least one CSI process corresponding to N lowest-indexed CSI processes, wherein the N indicates the maximum number of CSI processes.

9. The UE of claim 7, wherein the control unit further transmits the maximum number of CSI processes supported by the UE.

10. A base station, in a communication system, the base station comprising:

a communication unit for communicating with a User Equipment (UE);

a control unit for transmitting a request for channel state information (CSI) report to a user equipment (UE), obtaining a maximum number of CSI processes supported by the UE, and receiving, from the UE, at least one CSI generated based on at least one CSI process to be updated, wherein the at least one CSI process is determined based on the maximum number of CSI processes supported by the UE and index of CSI process.

11. The base station of claim 10, wherein the at least one CSI process corresponds to N lowest-indexed CSI processes, wherein the N indicates the maximum number of CSI processes.

12. The base station of claim 10, wherein the control unit further receives the maximum number of CSI processes supported by the UE.

\* \* \* \* \*